United States Patent
Ford et al.

[11] Patent Number: 5,545,448
[45] Date of Patent: Aug. 13, 1996

[54] COLORED EXTRUDED STRIPS

[75] Inventors: Peter R. Ford, Midway; Neil Thorley, Sileby; Martin J. Foy, Ashby-De-La-Zouch, all of United Kingdom

[73] Assignee: Schlegel (UK) Holdings Limited, Leicester, United Kingdom

[21] Appl. No.: 201,173

[22] Filed: Feb. 24, 1994

[30] Foreign Application Priority Data

Feb. 24, 1993 [GB] United Kingdom .................... 9303678

[51] Int. Cl.$^6$ ..................................................... E06B 7/16
[52] U.S. Cl. ........................... 428/31; 49/475.1; 428/122; 428/358
[58] Field of Search ..................... 428/122, 358, 428/31; 49/475.1; 292/DIG. 70; 296/93

[56] References Cited

U.S. PATENT DOCUMENTS

| | | | |
|---|---|---|---|
| 3,549,583 | 12/1970 | Nagata et al. | 428/31 X |
| 3,981,958 | 9/1976 | Nakashima et al. | 428/31 X |
| 4,442,156 | 4/1984 | Yamaguchi | 428/122 X |
| 4,631,206 | 12/1986 | Mabuchi et al. | 428/424.6 X |
| 4,943,466 | 7/1990 | Bareich | 428/122 |
| 4,975,306 | 12/1990 | Jackson | 428/122 X |
| 4,994,311 | 2/1991 | Junker | 428/122 |
| 5,035,937 | 7/1991 | Nozaki | 428/122 |
| 5,143,772 | 9/1992 | Iwasa | 428/122 |
| 5,332,600 | 7/1994 | Iwasa | 428/122 X |
| 5,354,594 | 10/1994 | Naito et al. | 428/122 |
| 5,389,409 | 2/1995 | Iwasa et al. | 49/475.1 X |

FOREIGN PATENT DOCUMENTS

| | | |
|---|---|---|
| 2076716 | 3/1990 | Japan . |
| 1061623 | 3/1967 | United Kingdom . |
| 1175497 | 12/1969 | United Kingdom . |
| 1282988 | 7/1972 | United Kingdom . |
| 1372154 | 10/1974 | United Kingdom . |
| 1447223 | 8/1976 | United Kingdom . |
| 1529348 | 10/1978 | United Kingdom . |

*Primary Examiner*—Henry F. Epstein
*Attorney, Agent, or Firm*—Cumpston & Shaw

[57] ABSTRACT

A strip formed at least partly of elastomeric material has at least a portion of its surface colored by application of a colored spray coating. In order to provide a distinct boundary between colored and uncolored portions of the strip an integral tear-off bead projecting outwardly from the surface may be provided with the colored spray coating being applied to one side thereof only. If desired, two different colored coatings may be applied, one to either side of the bead. The strip is particularly suited for use as a vehicle weatherseal and may, therefore, be of composite construction with a flange gripping portion and a sealing portion. The spray coating preferably consists of a polyurethane based finish utilizing a blend of individual components which adheres to the surface of the strip yet maintains the strip's flexibility.

22 Claims, 2 Drawing Sheets

COLORED EXTRUDED STRIPS

This invention relates to coloured extruded strips, and particularly to spray coated weatherseals, and to their method of manufacture. The invention also extends to products made up from extruded strips, and while the invention is particularly concerned with weatherseals, it is not so limited.

Traditionally, the majority of weatherseals have been produced from black polymeric material, e.g. rubber, or from an extruded plastics of a neutral colour. However, in the motor and building industries, there is now a requirement that weatherseals are coloured to match or contrast with the colour finish of the vehicle or building in which they are used. In the past, coloured seals have been provided by using a coloured cloth which overlies a black base material, these are expensive to manufacture.

Traditionally, in the motor industry, coloured plastics edge trims or U-shaped flange gripping strips in which a carrier may be located, are often combined with elastomeric dynamic sealing bulbs or lips which are normally black, the elastomeric material providing the correct degree of elasticity, as this cannot be achieved ,with extruded plastics materials.

In the motor industry, there is now considerable reluctance to use plastics materials, such as PVC which can be extruded in almost any chosen colour, for door seals and the like because they are toxic and could be dangerous in a fire. Accordingly, there is now a desire to make edge trims, seals and combination seals incorporating edge trims entirely of elastomeric material. While it is possible to extrude elastomeric material in selected colours, these are expensive and traditionally the seals are black. Unfortunately, however, black seals and combination trim/seals are becoming less and less acceptable to motor car manufacturers who prefer the seals to be colour matched to either the interior trim and/or to the external paintwork of the vehicle. It is, however, recognised that it is not easy to paint or otherwise to colour black elastomeric material in a cost-effective manner.

The present invention seeks to overcome this problem.

According to the present invention, we provide a strip formed at least partly of elastomeric material wherein at least a portion of a surface of the strip has a surface layer thereon applied by spray coating, the surface layer being of a selected colour and being flexible. The strip may be a weather seal, e.g. for a motor vehicle.

The seal may be formed with an integral tear-off bead projecting outwardly from the surface thereof, the bead providing a boundary line between a surface coated area of the seal and a non-coated area.

If desired, two different coating materials may be applied to the strip, one to each side of the bead. If desired, the bead may be of substantial width and connected to the strip at two spaced points by tear-strips so that when the bead is torn away from the strip an uncoated area remains.

The strip may be of composite construction comprising a dynamic sealing portion adhered to a static carrier portion and the spray coating may be applied to a surface area thereof bridging the boundary between the two portions.

Preferably the spray coating consists of a polyurethane based finish utilising a blend of individual components allowing excellent flexibility and adhesion to all relevant substrates in the strip.

Also according to the invention, we provide a method of forming a coloured strip or a coloured component made from strip material, wherein the strip or component is coloured by spray coating, as described herein.

BRIEF DESCRIPTION OF THE DRAWINGS

Several embodiments of the present invention are now described by way of example with reference to the accompanying drawings, in which.

Figure 1:
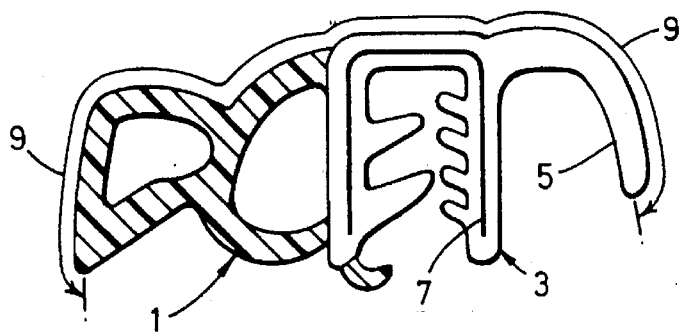
FIG. 1 is a cross-section through a combination edge trim and door seal for a motor vehicle.

Referring to the drawings, a composite door seal and edge trim is shown comprised of a dynamic bulbous seal portion 1 extruded in one from an elastomeric material such as EPDM in known manner, with a static edge trim or carrier portion 3. The portion 3 incorporates an integral flap seal portion 5 and has a metallic carrier 7 formed therein. In the past, such a combined seal 1 and carrier portion 3, if it has had to colour match the paintwork or the interior of the vehicle, has had the static portion 3 formed either of a coloured plastics material, or all or part of the product has been coated with coloured cloth. In accordance with the invention, however, the whole of the outer surface area of the combination seal and edge trim is covered with a coloured spray coating 9.

Figure 2:
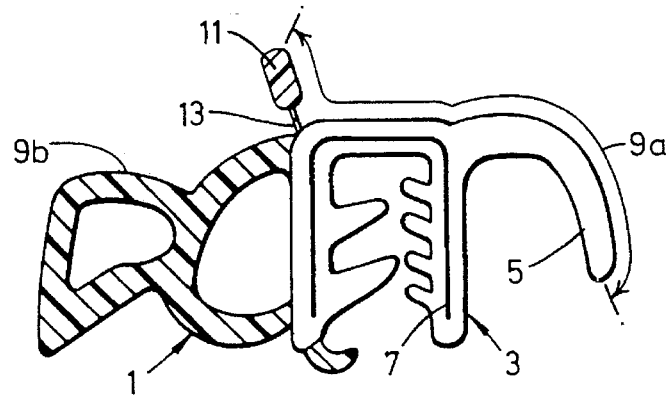
FIG. 2 is a view similar to FIG. 1 but of an alternative embodiment of combination seal.

In the embodiment of FIG. 2, the combination seal and edge trim has a bead 11 connected to it by a thin tear strip portion 13, both the bead 11 and tear strip portion 13 being formed of the same elastomer as the remainder of the combination seal and edge trim. Since the bead upstands from the surface of the combination seal/edge trim, it forms a barrier wall allowing one external or visible surface area of the combination seal/edge trim to be spray coated with a coloured spray coating 9a but which ensures that the remainder of the visible surface 9b of the seal is uncoated. Subsequent to the coating process, the bead 11 can be removed by tearing along the tear strip portion 13, thus providing a sharp boundary line between the coated and uncoated portions of the seal.

Figure 3:
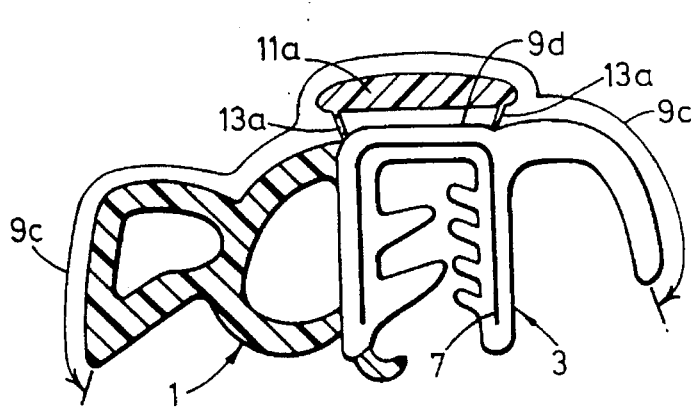
FIG. 3 is a view similar to FIG. 2 but of a yet further embodiment.

In the construction shown in FIG. 3, the combination seal/edge trim has an enlarged tear-off bead 11a connected to the static carrier portion 3 by two spaced thin tear strips 13a. In this embodiment, the whole of the external surface of the seal can be spray coated with a coloured spray coating 9c. By tearing away the bead 11a, a non-coated area 9d is left on the seal, which has a width approximately equal to the spacing of the tear strips 13a.

Figure 4:
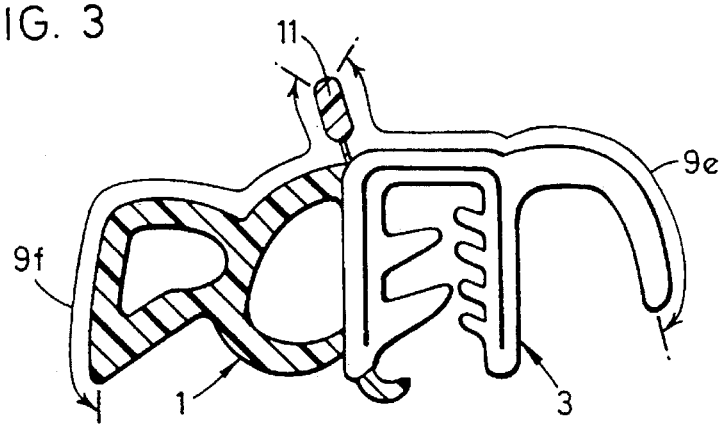
FIG. 4 is a view similar to FIG. 2 but showing a modification thereof.

FIG. 4 shows a modified version of the seal of FIG. 2 which can have a first surface area coated with a coloured spray coating 9e and a second surface area covered with a spray coating 9f, the two areas being separated from each other by the tear-off bead 11 which, when removed, will leave a sharp boundary area between the two different coloured coatings 9e and 9f.

In all the constructions described, the dynamic seal portion may be formed of foamed elastomeric material.

Figure 5:
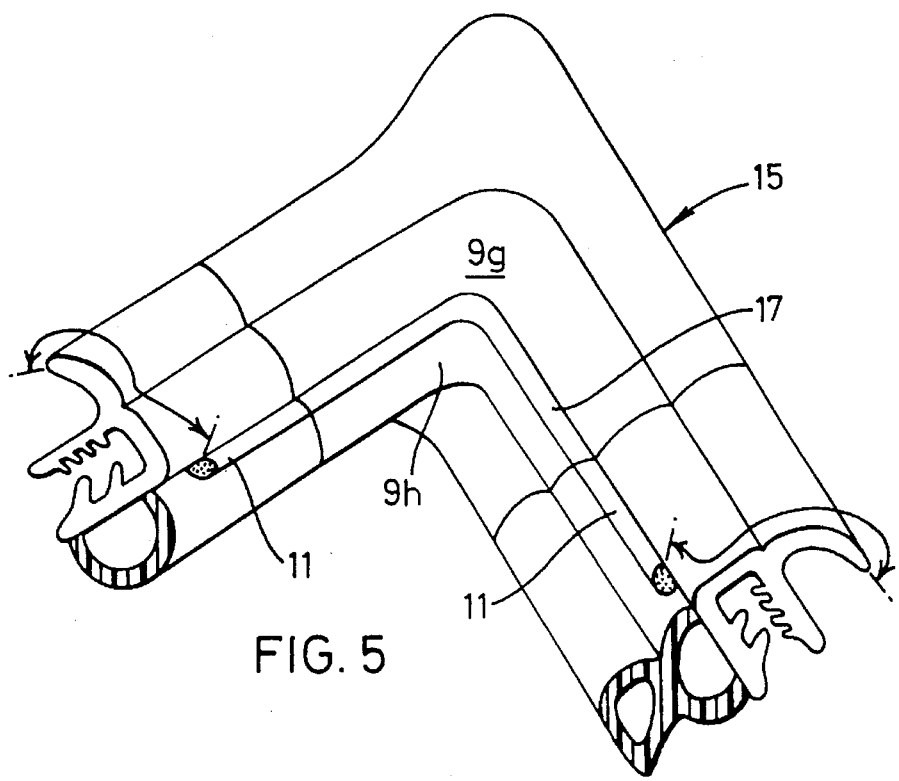
FIG. 5 is a perspective view of a corner portion of a made up door seal for a motor vehicle showing how the present invention is incorporated therein.

In FIG. 5, a traditional corner joint of a made up vehicle door seal is shown, the joint being formed of a moulded corner 15 secured in known manner, e.g. with adhesive, to two lengths of the extruded combination seal/edge trim shown in FIG. 2. Using the spray coating technique of the present invention, it is possible to coat not only the extruded combination seal/edge trim portions of the door seal, but also the moulded corner 15, and the nature of the coloured spray coating is such that it will not only mask any difference in appearance between the moulded corner 14 and the extruded portions, but will also hide the joins at each end of the moulded corner 15. In order to achieve a sharp boundary line between the coated area 9g of the moulded corner 15 and its non-coated area 9h, a moulded tear-off bead 17 in line with the bead 11 is provided. Alternatively, conventional means such as masking tape may be used.

The spray coating consists of a two component material. One component is a mixture of a branched hydroxyl-bearing polyester and a hydroxyl-bearing polyacrylate dissolved in aromatic hydrocarbon and aliphatic ester solvents, in which colouring pigments and fluorocarbon polymers are suspended.

The above component is then blended in an exact proportion to allow precise reaction stoichiometry with the cross linking component, this being a solution of two aliphatic polyisocyanates in aromatic hydrocarbon and aliphatic ester solvents in which fluorocarbon polymer is suspended.

The ratio of the individual polyisocyanates to each other is critical in affording a polyurethane coating material with the correct properties of adhesion, flexibility and light fastness.

The coating thus formulated provides excellent adhesion to both substrates, the dynamic seal portion and the static edge trim portion in the described extrusions.

The ratios of binder constituents to each other are as follows. Values are expressed as % total binder before cross linking:

Branched hydroxyl-bearing polyester 40–50%.
Branched hydroxyl-bearing polyacrylate 10–20%.
Aliphatic polyisocyanate 10–30%.
Elastic aliphatic polyisocyanate 10–30%.
All values by weight.

By applying a coloured spray coating as disclosed herein to one or more surface portions of a combination seal/edge trim, the coated surface portion is easily cleanable, has low surface friction and high wear resistance, yet is flexible. This means that it is resistant to damage during application of the edge trim portion to a flange, e.g. using a mallet or a semi-automatic crimping tool. Likewise, it will not scuff when inserted into a retaining channel, or is subjected to some other mechanical fixing process.

The spray coating is colour fast, and being opaque, it completely covers the black elastomer (or other substrate) onto which it is sprayed. The coating is available in many different colours, different levels of glossiness, and different textures. The coated strip also has good ice/freeze release properties, and is generally weather resistant. Furthermore, because of the coloured spray coating, it is possible to use less expensive, less inherently weather resistant rubber compounds for the portions 1 and 3.

The spraying process offers a wide range of benefits not possible with conventional coloured seal manufacturing processes, such as:

1. Colouring complex shapes with or without graining.
2. Colouring sponge and dense portions of a weatherseal, as shown in FIG. 1 or FIGS. 3, 4 and 5; traditionally only the dense portion can be coloured.
3. Because of the low surface friction properties, low door shut pressures can be achieved. Also, good ice release properties to the dynamic portion of the seal can be achieved at the same time as colouring it (see FIG. 1).
4. A sharp cut off to the edge of the sprayed area, or between two sprayed areas, can be provided by the sacrificial tear off portion 11. It is also possible to provide different sacrificial tear off portions 11a to mask large areas where colour is not required, as shown in FIG. 3.
5. It is possible to colour different parts of the seal with different colours, e.g. to match the interior trim with the carrier portion 3 of the strip and the body with the dynamic portion, as shown in FIG. 4.
6. It is also possible to spray under a cosmetic flip to reduce fitting effort when the strip is fitted snugly onto internal trim of a vehicle.
7. Modern sealing technology often requires the joining together of similar or different profiles via complex mouldings. With sprayed colour coating, it is possible to match the colour of the complex moulding to the colour of the bulk of the seal. Simple conventional mechanical or tape masking can be used to control the coloured areas of the corner moulding, as illustrated in FIG. 5.
8. Improved wear resistance to the sprayed area.

A typical combination seal/edge trim is manufactured in the following manner:

1. A polymeric strip, usually of EPDM rubber (and formed of dense and/or sponge rubber, which may or may not be reinforced with a carrier) is extruded in known manner.
2. The area to be colour sprayed is primed, e.g. mechanically, by flame treatment, corona discharge, chemical overspraying, chemical etching, or the like.
3. The colour coating (or coatings sequentially if more than one) are sprayed onto the extruded product. The spray coating can be applied by hand spraying, robotic spraying or automatic in-line spraying.
4. Energy is applied for a period of time chemically to stabilise the coating.
5. The colour coated product is cooled, coiled if required and packed.

Figure 6:
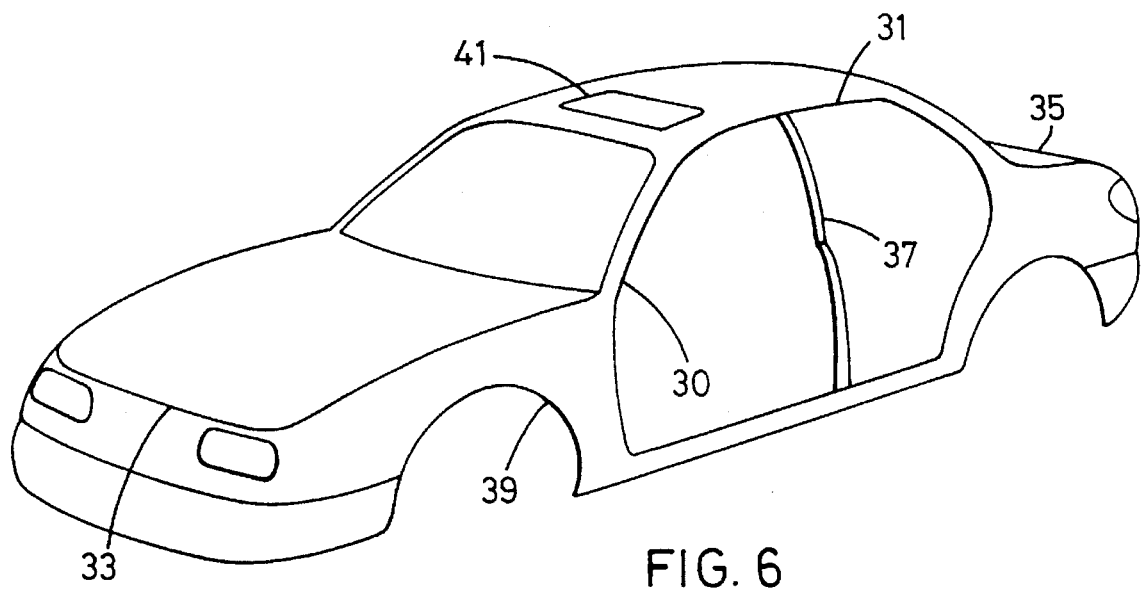
FIG. 6 is a schematic representation of a motor vehicle showing various locations where the present invention could be incorporated.

Although the invention has been particularly described with reference to combination seal/edge trim 30 (see FIG. 6) for use in motor vehicles, it can be used for other vehicle sealing applications, such as drip rails 31, bonnet seals 33, boot or tailgate seals 35, outer margin trim strips 37, wheel arch edging strips 39 (to which anti-spray bristles could be attached), or as a sun roof trim/seal 41. There are also numerous other uses in domestic glazing, building, highway, agricultural and other markets.

It will of course be understood that the present invention has been described above purely by way of example, and modifications of detail can be made within the scope of the invention.

What is claimed is:

1. A motor vehicle, weather sealing strip formed at least partly of elastomeric material comprising:

a first portion for sealing with a surface of the vehicle;

a second carrier portion attached to the first portion for attaching the strip to the vehicle;

an integral tear-off bead projecting outwardly from a surface of one of the first portion and the second carrier portion; and a flexible surface layer of a selected color spray coated on at least a part of the one of said first and said second portions of the strip from which the tear-off bead projects, the bead providing a boundary line between the flexible surface layer of the strip and a remaining surface area of the strip.

2. A strip according to claim 1 which comprises an extruded weatherseal.

3. A strip according to claim 2 wherein two different coating materials are applied to the strip, one to each side of the bead.

4. A strip according to claim 3 wherein the bead is of substantial width and connected to the strip at two spaced points by tear-strips so that when the bead is torn away from the strip an uncoated area remains.

5. A strip according to claim 2 wherein the bead is of substantial width and connected to the strip at two spaced points by tear-strips so that when the bead is torn away from the strip an uncoated area remains.

6. A strip according to claim 1 wherein two different coating materials are applied to the strip, one to each side of the bead.

7. A strip according to claim 6 wherein the bead is of substantial width and connected to the strip at two spaced points by tear-strips so that when the bead is torn away from the strip an uncoated area remains.

8. A strip according to claim 6 wherein at least one of the two different coating materials is applied to a surface area thereof bridging the boundary between the two portions.

9. A strip according to claim 6 wherein at least one of the two different coating materials comprises a polyurethane finish utilizing a blend of individual components providing flexibility and adhesion to all relevant substrates in the strip.

10. A strip according to claim 1 wherein the bead is of substantial width and connected to the strip at two spaced points by tear-strips so that when the bead is torn away from the strip an uncoated area remains.

11. A strip according to claim 10 wherein the spray coating is applied to the uncoated area thereof bridging the boundary between the two portions.

12. A strip according to claim 10 wherein the spray coating comprises a polyurethane finish utilizing a blend of individual components providing flexibility and adhesion to all relevant substrates in the strip.

13. A strip according to claim 1 wherein the spray coating is applied to a surface area thereof bridging the boundary between the two portions.

14. A strip according to claim 13 wherein the spray coating comprises a polyurethane finish utilizing a blend of individual components providing flexibility and adhesion to all relevant substrates in the strip.

15. A strip according to claim 1 wherein the spray coating comprises a polyurethane finish utilizing a blend of individual components providing flexibility and adhesion to all relevant substrates in the strip.

16. A strip according to claim 1 wherein at least a part of the first portion of the strip has a surface layer thereon applied by spray coating.

17. A strip according to claim 1 wherein at least a part of the carrier portion of the strip has a surface layer thereon applied by spray coating.

18. A motor vehicle, weather strip formed at least partly of elastomeric material comprising:

a surface;

a flexible surface layer of a selected color spray coated on at least a portion of the surface; and an integral tear-off bead projecting outwardly from the surface of the strip, the bead providing a boundary between the flexible surface layer of the strip and a remaining surface area of the strip.

19. A motor vehicle weather strip according to claim 18 wherein two different coating materials are applied to the surface of the strip, one to each side of the bead.

20. A motor vehicle weather strip according to claim 18 wherein the bead is of substantial width and connected to the strip at two spaced points by tear-strips so that when the bead is torn away from the strip an uncoated area remains.

21. A motor vehicle weather strip according to claim 20 wherein the spray coating is applied to the uncoated area thereof bridging the boundary between the flexible surface layer and the remaining surface area of the strip.

22. A motor vehicle weather strip according to claim 18 wherein the spray coating comprises a polyurethane based finish utilizing a blend of individual components providing flexibility and adhesion to all relevant substrates in the strip.

* * * * *